Figure 1:
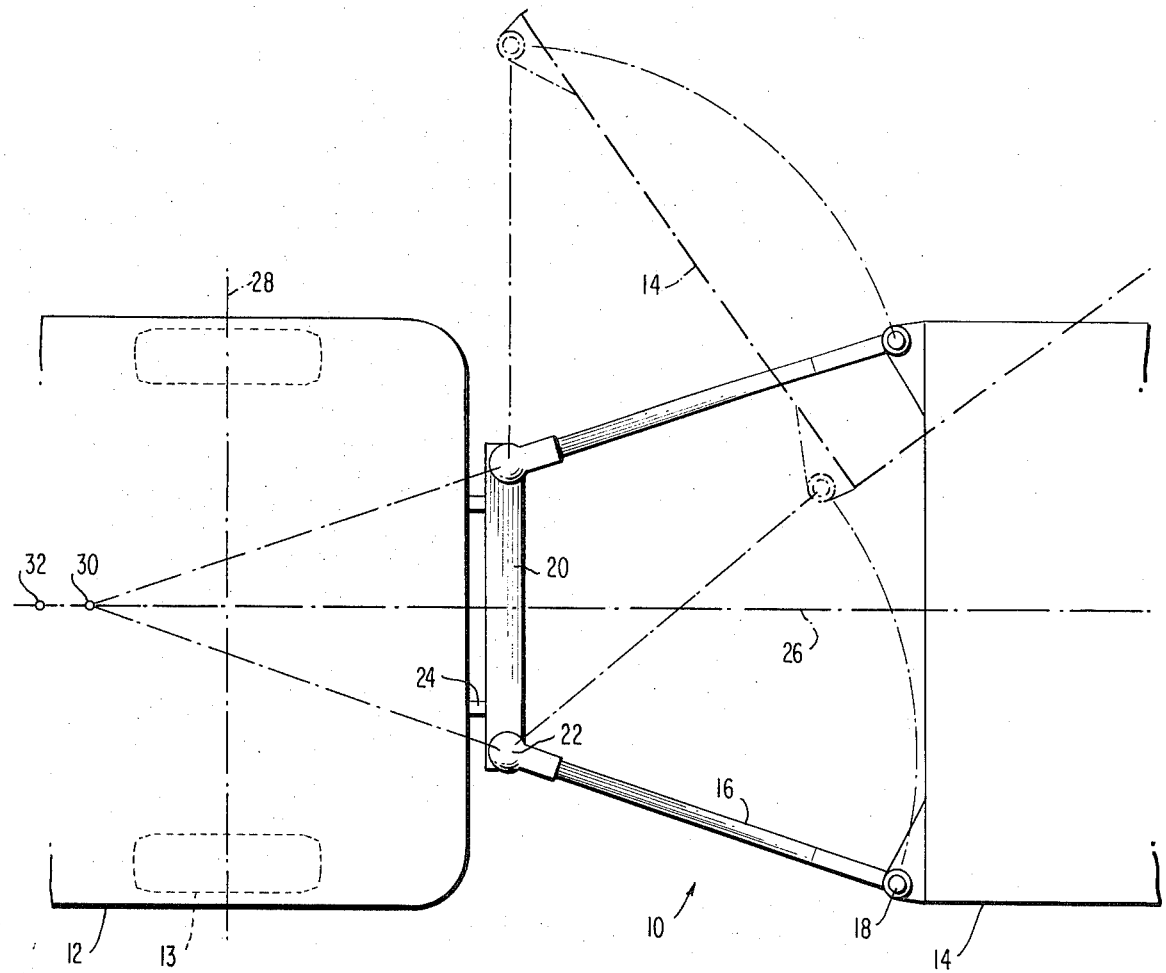

United States Patent [19]

Miller

[11] 3,787,068

[45] Jan. 22, 1974

[54] ARTICULATED TRAILER HITCH

[75] Inventor: Lester Miller, Topeka, Ind.

[73] Assignee: Bangor Punta Operations, Inc., Greenwich, Conn.

[22] Filed: Sept. 25, 1972

[21] Appl. No.: 292,059

[52] U.S. Cl. .............................. 280/446 R, 280/456
[51] Int. Cl. .............................................. B60d 1/06
[58] Field of Search 280/446 R, 460, 447, 456, 408

[56] References Cited
UNITED STATES PATENTS

| 2,444,944 | 7/1948 | Minter | 280/456 R |
| 1,852,537 | 4/1932 | Paul | 280/446 R |
| 3,425,715 | 2/1969 | Weitz | 280/447 X |

FOREIGN PATENTS OR APPLICATIONS

| 537,092 | 6/1941 | Great Britain | 280/460 R |

Primary Examiner—Leo Friaglia

[57] ABSTRACT

The trailer hitch includes a pair of tongues pivotally connected at opposite ends to a towing vehicle and a towed vehicle, respectively. The tongues are symmetrically arranged on opposite sides of a line coincident with the centerlines of the towing vehicle and the towed vehicle when the latter are longitudinally aligned. The tongues converge forwardly toward one another such that lines coincident with the long axes of the tongues intersect along the centerline of the towing vehicle at a location forwardly of its rear wheel axis and rearwardly of its center of gravity. The foregoing provides an effective hitch pivot point which sustantially reduces the tendency of the vehicles to sway relative to one another.

2 Claims, 2 Drawing Figures

ARTICULATED TRAILER HITCH

The present invention relates to apparatus for connecting a towing vehicle and a towed vehicle and particularly relates to an articulated trailer hitch arranged to substantially minimize sway of the vehicles relative to one another whereby improved trailerability is provided.

Conventional trailer hitches usually comprise a single tongue connected to the forwardmost wheel axis of the towed vehicle and extending forwardly for pivotable connection, usually by a ball joint, with a support bar mounted on the towing vehicle at its rear end. For example, the support bar is oftentimes secured to the rear fender or rear frame of the towing vehicle. The effective pivot point between the towing vehicle and the towed vehicle in such conventional trailer hitches is therefore at the ball joint between the single tongue and the support bar at the rear of the towing vehicle. As a result, there is established a large lever arm between such pivotable connection and the center of gravity of the towing vehicle. Consequently, a significant force is applied to the towing vehicle by the towed vehicle, for example, when the vehicles are rounding a curve or a corner tending to displace or sway the towing vehicle. Control over both vehicles is thus reduced and in some cases lost.

The present invention provides an articulated trailer hitch which minimizes or eliminates the foregoing and other problems associated with prior trailer hitches and provides a novel and improved articulated trailer hitch having various advantages in construction, mode of operation, and use in comparison with such prior trailer hitches. Particularly, it is a significant feature of the articulated trailer hitch hereof that the moment arm between the center of gravity of the towing vehicle and the effective hitch pivot point is located closer to the center of gravity of the towing vehicle than in such prior hitches. It is also a significant feature hereof that the effective hitch pivot point is located forwardly of the rear wheel axle of the towing vehicle. With the foregoing, the tendency of relative lateral movement of one vehicle to the other, i.e., sway, is substantially reduced or eliminated.

To these and other ends, the present invention provides an articulated trailer hitch comprised of a pair of tongues pivotally connected at opposite ends to the towing vehicle and the towed vehicle respectively. Particularly, the pivotable connections between the towing vehicle and the forward ends of the tongues comprise conventional ball type hitches at opposite ends of a transversely extending support bar secured to the rear frame of the towing vehicle. The pivotable connections between the tongues and the towed vehicle lie on opposite sides of the towed vehicle frame at its forward end. To locate the effective hitch pivot point forwardly of the rear wheel axle of the towing vehicle and also close to the center of gravity of the towing vehicle, the tongues converge forwardly toward one another whereby forward extensions of lines coincident with the long axes of the tongues intersect one another along the centerline of the towing vehicle and along a straight line coincident with the centerlines of the towing and towed vehicles when the vehicles are longitudinally aligned one with the other. The tongues and connections therefor are symmetrically arranged on opposite sides of the straight line coincident with the vehicle centerlines. By the foregoing arrangement, the effective hitch pivot point is located forwardly of the rear wheel axis of the towing vehicle and the length of the lever arm between the center of gravity of the towing vehicle and the effective hitch pivot point is therefor substantially reduced. Consequently, the forces interacting between the towing and towed vehicles, for example, when the vehicles round a curve or a corner, and which forces might otherwise cause undesirable relative lateral movement or sway of the vehicles, are substantially eliminated.

Accordingly, it is a primary object of the present invention to provide a novel and improved articulated trailer hitch and thereby to provide improved trailerability.

It is another object of the present invention to provide a novel and improved articulated trailer hitch wherein the effective hitch pivot point is located forwardly of the rear wheel axis of the towing vehicle whereby improved control over the towing and towed vehicles is obtained.

It is still another object of the present invention to provide a novel and improved articulated trailer hitch wherein the effective hitch pivot point is located closer to the center of gravity of the towing vehicle than in prior conventional trailer hitches thereby providing a significantly reduced lever arm over which forces interacting between the towing and towed vehicles are transmitted.

It is a further object of the present invention to provide a novel and improved articulated trailer hitch wherein the effective hitch pivot point is located between the rear wheel axis and the center of gravity of the towing vehicle.

It is still a further object of the present invention to provide a novel and improved articulated trailer hitch wherein the forces interacting between the vehicles tending to produce relative lateral motion therebetween are substantially reduced.

It is a related object of the present invention to provide a novel and improved articulated trailer hitch which is simple and economical in construction, readily adapted and applied to existing vehicles and trailers and which provides increased control over the towing and towed vehicles.

Figure 2:
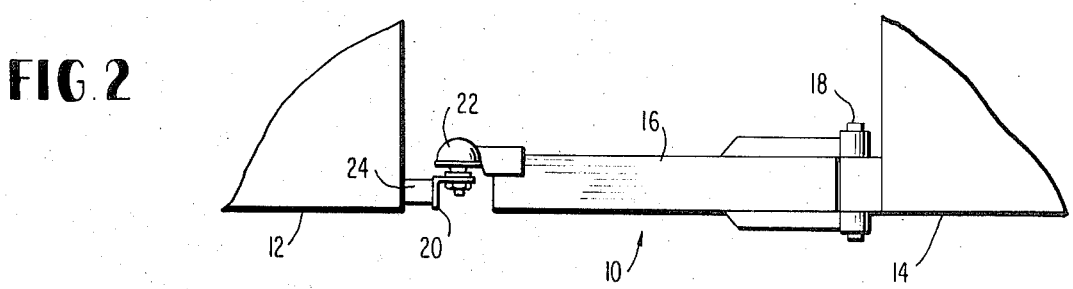

These and further objects and advantages of the present invention will become more apparent upon reference to the following specification, appended claims and drawings wherein:

FIG. 1 is a fragmentary plan view of an articulated trailer hitch constructed in accordance with the present invention; and FIG. 2 is a fragmentary side elevational view thereof.

Referring now to FIG. 1, there is illustrated an articulated trailer hitch generally indicated 10 interconnecting a towing vehicle 12, for example an automobile, the rear wheels of which are illustrated by the dashed lines and indicated 13, and a towed vehicle 14, for example a trailer. Hitch 10 includes a pair of elongated connecting members or tongues 16 pivotally mounted at opposite ends to the towing vehicle 12 and the trailer 14, respectively. The rear ends of the connecting members 16 are pivotally connected to the frame of the towed vehicle 14 adjacent outboard sides thereof and at its forward end by a pinned connection indicated 18. The forward ends of tongues 16 are pivotally coupled to a transversely extending support bar 20 at its opposite ends by conventional ball hitches 22. Bar 20 is suitably connected to the frame of the towing vehicle by connections 24.

As illustrated in FIG. 1, the trailer hitch 10 is symmetrical on opposite sides of a line 26 coincident with the centerlines of the towing vehicle and the trailer when the towing vehicle and trailer lie longitudinally aligned with the towed vehicle directly behind the towing vehicle. It is a particular feature of the present invention that the effective pivot point of the trailer relative to the towing vehicle lies forwardly of the rear wheel axis 28 of the towing vehicle and close to the center of gravity of the towing vehicle. To accomplish this, the tongues 16 converge toward one another in a forward direction. Thus, the effective pivot point, illustrated at 30 in FIG. 1, is located at the intersection of extensions of lines coincident with the long axes of the converging connecting members 16. It will be noted that the center of gravity 32 of the towing vehicle lies substantially along the centerline 26 and that the effective hitch pivot point 30 is thus located closer to the center of gravity 32 than would be the case with conventional hitches wherein the pivot point of the towed vehicle relative to the towing vehicle is located rearwardly of the wheel axle and generally along the rear fender of the towing vehicle.

By locating the effective hitch pivot point between the towing vehicle and the towed vehicle at a location substantially closer to the center of gravity of the towing vehicle, the moment arm tending to laterally displace or sway the towing vehicle in response to the interaction of forces applied to the vehicles when the latter are moving is substantially reduced. Also, as illustrated, the effective hitch pivot point is located forwardly of the rear wheel axis 28 of the towing vehicle 12. In this manner, the controllability of the towing and towed vehicles is maintained.

Accordingly, the present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An articulated trailer hitch for joining a towing vehicle and a towed vehicle comprising in combination: a pair of elongated tongues, means carried by said tongues adjacent the opposite ends thereof for pivotally mounting the tongues to the towing vehicle and the towed vehicle respectively, said tongues being substantially symmetrically arranged on opposite sides of a line coincident with the longitudinal centerlines of the towing vehicle and the towed vehicle when such vehicles are in longitudinal alignment one with the other, said tongues converging toward one another in a direction toward the towing vehicle to provide an effective hitch pivot point substantially coincident with the centerline of the towing vehicle and forwardly of the pivotable connection between said tongues and the towing vehicle; a towing vehicle having a pair of rear wheels defining a rear wheel axis, said effective hitch pivot point being located forwardly of the axis of said rear wheels and being formed by the intersection of forward extensions of lines coincident with the long axes of said tongues, said intersection being located between the center of gravity of said towing vehicle and said rear wheel axis.

2. An articulated trailer hitch for joining a towing vehicle and a towed vehicle comprising in combination: a pair of elongated tongues, means carried by said tongues adjacent the opposite ends thereof for pivotally mounting the tongues to the towing vehicle and the towed vehicle respectively, said tongues being substantially symmetrically arranged on opposite sides of a line coincident with the longitudinal centerlines of the towing vehicle and the towed vehicle when such vehicles are in longitudinal alignment one with the other, said tongues converging toward one another in a direction toward the towing vehicle to provide an effective hitch pivot point substantially coincident with the centerline of the towing vehicle and forwardly of the pivotable connection between said tongues and the towing vehicle; a towing vehicle having a pair of rear wheels defining a rear wheel axis and a towed vehicle having a frame, a transversely extending support bar carried at the rear end of said towing vehicle, said pivotal mounting means for the forward ends of said tongues including ball hitches coupled to said support bar adjacent opposite ends thereof, the pivotal connection between said tongues and said towed vehicle being located at the forward end of the towed vehicle adjacent opposite sides thereof, said effective hitch pivot point being formed by the intersection of forward extensions of lines coincident with the long axes of said tongues, said intersection being located between the center of gravity of said towing vehicle and said rear wheel axis.

* * * * *

Disclaimer 3,787,068.—*Lester Miller*, Topeka, Ind. ARTICULATED TRAILER HITCH. Patent dated Jan. 22, 1974. Disclaimer filed Nov. 28, 1975, by the assignee, *Bangor Punta Operations, Inc.*

Hereby enters this disclaimer to the remaining term of said patent.

[*Official Gazette June 1, 1976.*]